(12) United States Patent
Tsai et al.

(10) Patent No.: US 8,104,112 B2
(45) Date of Patent: Jan. 31, 2012

(54) PORTABLE SOLAR SHOWER

(76) Inventors: Jyh-Hsin Tsai, Shanghai (CN);
Huai-Ping Wang, Ningbo (CN)

( * ) Notice: Subject to any disclaimer, the term of this patent is extended or adjusted under 35 U.S.C. 154(b) by 658 days.

(21) Appl. No.: 12/204,905

(22) Filed: Sep. 5, 2008

(65) Prior Publication Data
US 2010/0058532 A1    Mar. 11, 2010

(51) Int. Cl.
*A47K 3/28* (2006.01)
(52) U.S. Cl. ......... 4/598; 4/602; 4/616; 4/626; 126/640; 126/704; 251/153
(58) Field of Classification Search ............. 4/602, 612, 4/616, 599, 598, 596, 615, 516–518, 626, 4/625, 300.3; 126/640, 627, 704; 285/354; 251/145, 148, 153; 137/625.47
See application file for complete search history.

(56) References Cited

U.S. PATENT DOCUMENTS

| | | | | |
|---|---|---|---|---|
| 629,648 A | * | 7/1899 | Boatenreiter | 137/625.23 |
| 1,240,586 A | * | 9/1917 | McDowell | 251/181 |
| 3,067,434 A | * | 12/1962 | Neal et al. | 4/598 |
| 3,760,431 A | * | 9/1973 | Schwibner | 4/616 |
| 5,507,275 A | * | 4/1996 | Clark | 126/627 |
| 6,049,919 A | * | 4/2000 | Roteman | 4/602 |
| 6,082,395 A | * | 7/2000 | Balint | 137/382 |
| D436,158 S | * | 1/2001 | Burdette et al. | D23/283 |
| 6,859,955 B2 | * | 3/2005 | Hudson | 4/601 |
| 7,114,202 B1 | * | 10/2006 | Padrick | 4/615 |
| 7,124,453 B2 | * | 10/2006 | Sun | 4/675 |
| 2008/0256700 A1 | * | 10/2008 | Gaiti | 4/598 |
| 2009/0236000 A1 | * | 9/2009 | Miller et al. | 137/625.47 |

* cited by examiner

*Primary Examiner* — Robert Canfield
*Assistant Examiner* — Babajide Demuren
(74) *Attorney, Agent, or Firm* — Szaferman Lakind Blumstein & Blader PC

(57) ABSTRACT

A portable solar shower includes two detachable water reservoirs. One of the reservoirs may be coupled to a water source and includes a diverter valve regulating the flow and temperature of water spayed by a shower head, and the other reservoir has a port for coupling to the shower head. When the solar shower is not in use, the reservoirs may be separated from one another to form a compact package adapted for storage or transportation.

12 Claims, 7 Drawing Sheets

PORTABLE SOLAR SHOWER

CROSS REFERENCE TO RELATED APPLICATIONS

This application is related to and claims benefit from pending non-provisional U.S. patent application Ser. No. 12/176,918, filed Jul. 21, 2008, which is incorporated herein by reference in its entirety.

FIELD OF THE INVENTION

The present invention relates generally to showering equipment for outdoor use and, more particularly, to a portable solar shower.

BACKGROUND OF THE INVENTION

Various configurations of solar showers including structural elements having lengths of about 6-7 feet have previously been disclosed. For both manufacturers and consumers of such solar showers, their storage and transportation represent a challenging task.

SUMMARY OF THE INVENTION

A portable solar shower is disclosed. In one embodiment, the solar shower includes a first water reservoir having a port for coupling to a water source and a diverter valve for regulating the flow and temperature of water spayed by a shower head thereof, and a second water reservoir having a port for coupling to the shower head. In an exemplary embodiment, the second reservoir is elongated and tubular is shape, with a first end for connecting to the first reservoir and a curved second end having a port for coupling with the shower head. The reservoirs are detachably connected to one another (e.g., using a threaded joint having an outer threaded lock nut, a rubber seal, and an inner threaded coupler attached to the first reservoir for receiving the first end of the second reservoir, etc.). When the solar shower is not in use (for example, stored or transported), the reservoirs may be separated from one another to provide even greater compactness and portability of the shower.

All objects, features and advantages of the present invention will become apparent in the following detailed written description.

The Summary is neither intended nor should it be construed as being representative of the full extent and scope of the present invention, which these and additional aspects will become more readily apparent from the detailed description, particularly when taken together with the appended drawings.

Figure 1:
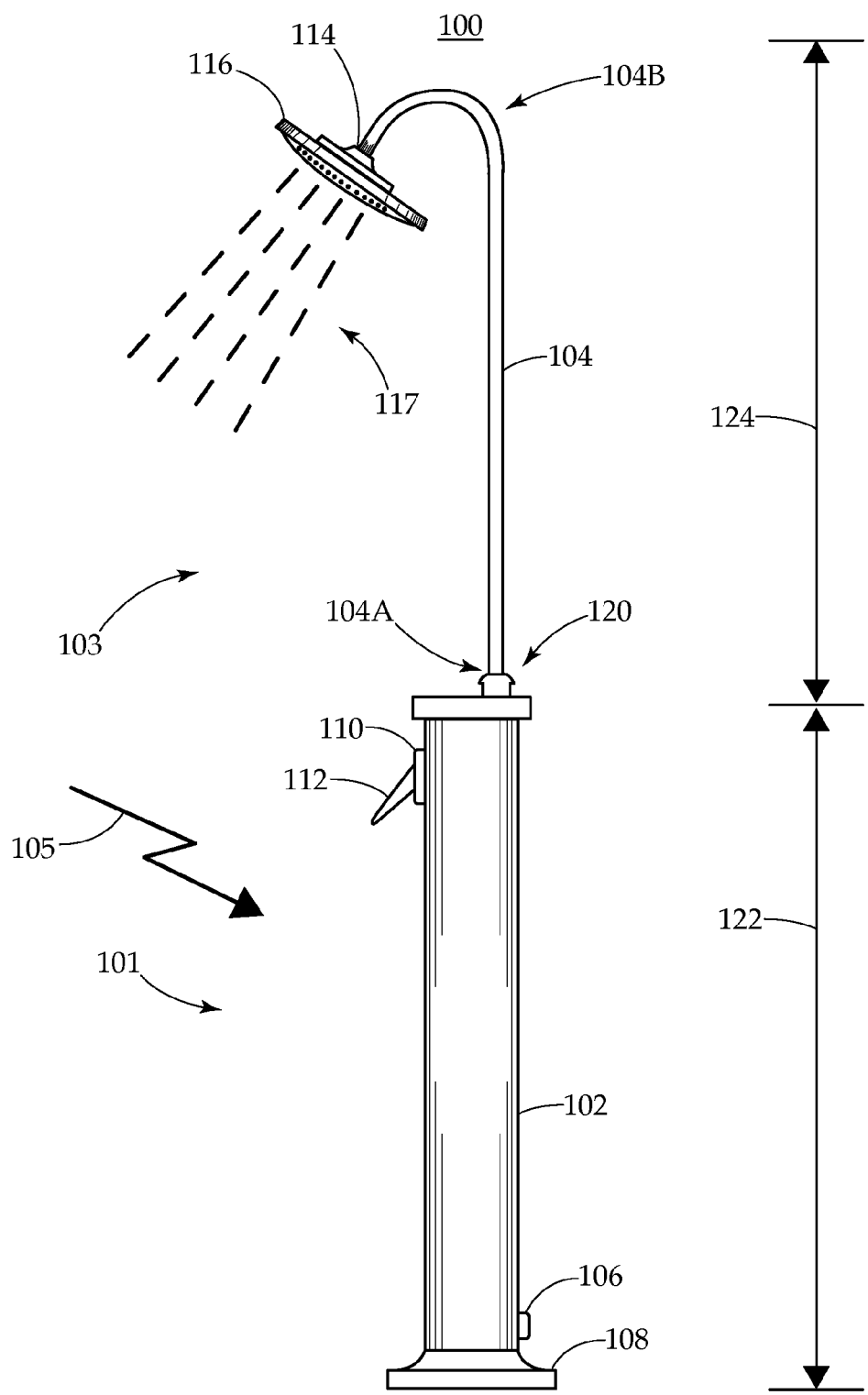
FIG. 1 is a schematic drawing illustrating a solar shower, according to one embodiment of the invention.

The images in the drawings are simplified for illustrative purposes and are not depicted to scale. To facilitate understanding, identical reference numerals are used, where possible, to designate substantially identical elements that are common to the figures, except that suffixes may be added, when appropriate, to differentiate such elements.

It has been contemplated that features or steps of one embodiment may be incorporated in other embodiments of the invention without further recitation.

DETAILED DESCRIPTION

The present invention provides a portable solar shower. The invention may advantageously be utilized as an outdoor washing apparatus in open spaces such as, for example, pools, gardens, outdoor hot tubs, campgrounds, etc.

With reference now to the figures, and in particular with reference to FIG. 1, there is depicted a schematic drawing illustrating a solar shower 100, according to one embodiment of the invention. The shower 100 includes a first water reservoir 101, a second water reservoir 103, and a shower head 116. The second water reservoir 103 is detachably connected to the first reservoir 101 through a connector portion 120. Internal pluming of the reservoirs 101 and 103 is discussed in detail below in reference to FIGS. 2-3. In operation, water contained in the reservoir 101 is heated by solar radiation 105, while the elongated, tubular shape of the reservoir 103 allows for quick transport of hot, warm and/or cold water to the shower head 116 resulting in shower spray 117.

The reservoir 101 generally includes an enclosure 102, an intake port 106, a diverter valve 110 having a handle 112, and a base 108. The base 108 supports the shower 100 in an operational position (for example, substantially vertical position). The shower 100 may be coupled to a water source (for example, residential water plumbing or an attachment thereto, such as a garden hose, etc.) via the intake port 106. The flow and temperature of the water flowing into and sprayed by the shower head 116 are regulated using the diverter valve 110.

Typically, the enclosure 102 has a form factor of an elongated cylinder that, in cross-sections, has circular, rectangular, and the like shapes. The enclosure 102 may be fabricated from polymers, plastics, composites, metals, alloys, or a combination thereof. In one exemplary embodiment, the enclosure 102 is fabricated from polyvinyl chloride ("PVC"), polyethylene ("PE"), polypropylene ("PP"), acrylonitrile butadiene styrene ("ABS") or acrylonitrile styrene acrylate ("ASA") using, for example, injection-molding or extrusion techniques.

The reservoir 103 generally includes an enclosure 104 having a first end 104A for detachably connecting to reservoir 101 (by means of the connector portion 120), a second curved end 104B for connecting to the shower head 116, and an outlet port 114 adapted for coupling the second curved end 104B of enclosure 104 to the shower head 116. In one embodiment, a length 124 of the water reservoir 103 (about 3-3.5 feet) is approximately equal to a length 122 of the water reservoir 101.

Typically, the enclosure 104 has a form factor of an elongated cylinder that, in cross-sections, has circular, rectangular, and the like shapes. The enclosure 104 may be fabricated from polymers, plastics, composites, metals, alloys, or a combination thereof. In one exemplary embodiment, the enclosure 104 is fabricated from stainless steel, copper or any other metal based material suitable for use as plumbing piping. In an exemplary embodiment, enclosure 104 is elongated and tubular in shape and is comprised of stainless steel. Alternatively, the second end 104A of the enclosure 104 is not curved, i.e., it is substantially vertical, and the coupler 114 and shower head 116 are configured so as to allow the shower head to face substantially downward in an appropriate shower spray angle, which a user may modify by adjusting the shower head 116.

The connector portion 120 is generally a threaded joint comprised of an outer threaded lock nut 302 (shown in detail in FIG. 3), a rubber seal 304, and an inner threaded coupler 306A for receiving the first end 104A of enclosure 104, thereby providing a rigid and water-tight coupling between the reservoirs 101 and 103. As explained in greater detail within (particularly with regard to FIG. 3), connected reservoirs 101 and 103 may be detached by removing the lock nut 302 from the threaded coupler 306A (e.g., by disengaging the lock nut 302 from the threaded coupler 306A by unscrewing the lock nut 302). Once the lock nut 302 is detached from the inner coupler 306A, reservoirs 101 and 103 are readily detached by pulling them apart.

Figure 2:
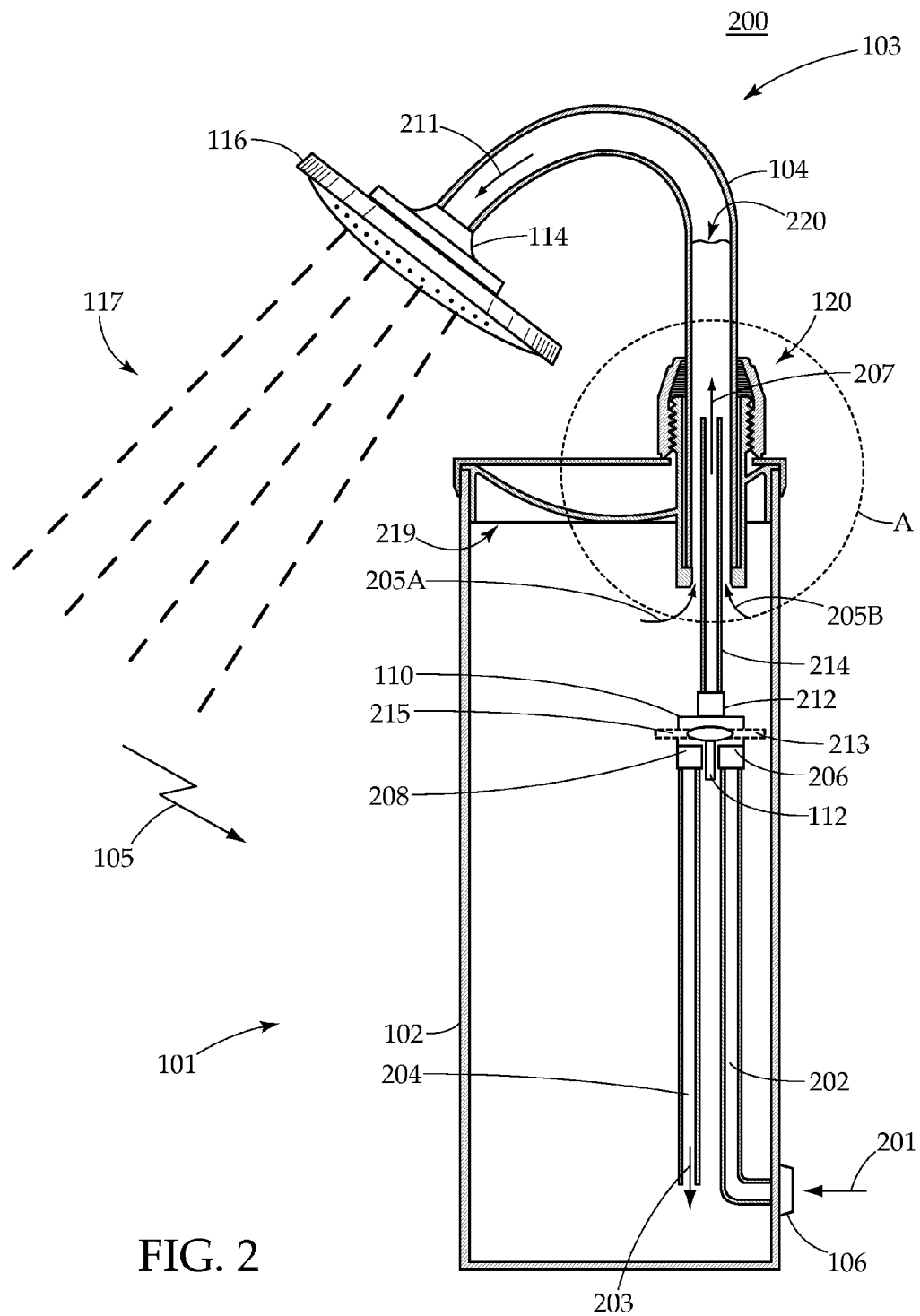
FIG. 2 is a schematic diagram illustrating various flows of water in the solar shower of FIG. 1.

FIG. 2 depicts a schematic diagram 200 illustrating a flow of water in the shower 100 of FIG. 1. Features of the shower 100 in FIG. 2 are not to scale and various portions or features depicted therein have been exaggerated for illustration purposes. Water is provided into the shower 100 via the intake port 106 of the reservoir 101, as shown with an arrow 201 (for example, by a garden hose).

Figure 3:
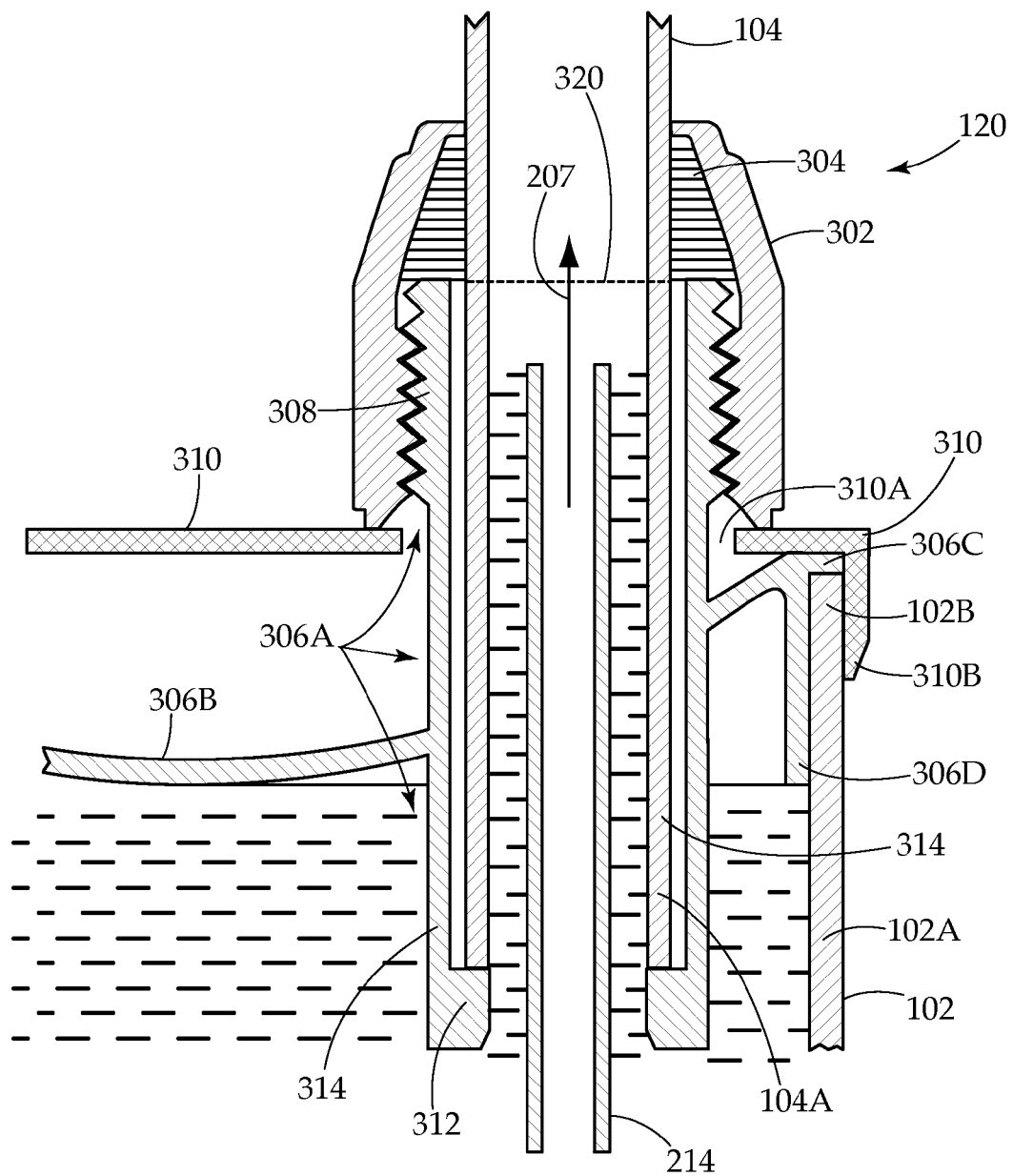
FIG. 3 is a schematic drawing illustrating a connection between reservoirs of the solar shower of FIG. 1.

Internal plumbing of the reservoir 101 comprises pipes 202, 204, and 214; the diverter valve 110 having an inlet 206 and outlets 208 and 212; and a connector portion 120 (depicted within a portion A of FIG. 2, an enlarged view of which is depicted in FIG. 3) for connecting the first and second reservoirs 101, 103. The pipe 202 connects the intake port 106 to the inlet 206 of the diverter valve 110, the pipe 214 extends from the outlet 212 of the diverter valve 110 and is fluidly connected to an interior of the reservoir 103 (for example, an end of pipe 214 is open into reservoir 103, as shown with arrow 207, when reservoir 103 is connected with reservoir 101), and the pipe 204 extends from the outlet 208 of the diverter valve 110 and is fluidly connected to an interior of the reservoir 101 (for example, an end of the pipe 204 is open into the reservoir 101, as shown with an arrow 203).

Internal plumbing of the reservoir 103 comprises pipe 214, originating from outlet 212 of the diverter valve 112 in reservoir 101. The pipe 214 terminates in and is fluidly connected to an interior of reservoir 103 (as shown with arrow 207). Reservoir 103 is comprised of an elongated enclosure 104 and originates at its first end 104A within the coupler portion 306A of an inner cover/coupler unit 306 (hereinafter, the "ICCU 306") (depicted in detail in FIG. 3) and terminates at its curved second end 104B at the outlet port 114, which is connected to the shower head 116.

Generally, the pipes 202, 204, and 214 may be fabricated from polymers, plastics, composites, metals, alloys, or a combination thereof. In one exemplary embodiment, these components of the shower 100 are fabricated from PVC, PE, PP, ABS or ASA using, for example, injection-molding or extrusion techniques.

In one extreme position of the handle 112 of the diverter valve 110, illustratively, in a position 213 (shown in phantom) (the "Hot Position"), water coming from the intake port 106 flows through the pipe 202, inlet 206 and outlet 208 of the diverter valve 110, and pipe 204 into the reservoir 101, as shown with the arrow 203. As the level of water rises in reservoir 101 towards the top of enclosure 102, water begins to flow into the first end 104A of the reservoir 103 as that first end is firmly seated within the coupler portion 306A of the ICCU 306 (shown with arrows 205A-B) (depicted in detail in FIG. 3). After the reservoir 101 is filled or substantially filled with water, the fill line of which is depicted by line 219, water continues to flow into and through the first end 104A, represented by arrows 205A-B. Thereafter, water flows into and fills the enclosure 104, represented, respectively, by arrows 207 and 211, eventually flowing through the outlet port 114 and through the shower head 116, exiting therefrom as shower spray 117. In operation, water in the reservoir 101 is heated by the solar radiation 105, and, with the handle 112 in the Hot Position, water flowing from the shower head 116 has a temperature T, depending, in part, as to whether the water in reservoir 101 has been sufficiently heated.

Typically, in order to heat water, a user of the shower 100 would close diverter valve 110 by moving the handle 112 to the "off" position as soon as the reservoir 101 is filled or substantially filled with water. By doing so, the water in the reservoir 101 is given time and opportunity to be heated by the solar radiation 105. If the water in a full or substantially full reservoir 101 (depicted by the fill line 219 in FIG. 2) is given sufficient time, for example, 1-3 hours, to be heated by radiation from the sun 105, the temperature T of shower water spray 117 will be higher, having a temperature T of T1, i.e., the water will be "hot."

If water within reservoir 101 is not given sufficient time to be heated by the sun, then allowing the handle 112 of the diverter valve 110 to remain open in the Hot Position upon filling reservoir 101 will result in the shower water spray 117 of the shower 100 to have a temperature approximating that of the temperature of the source water entering the intake port 106 (e.g., water from a garden hose) and the shower water spray 117 will have a temperature T of T2, i.e., the water will be "cold."

In another extreme position of the handle 112, illustratively, in a position 215 (shown in phantom) (the "Cold Position"), water coming from the intake port 106 flows through the pipe 202, inlet 206 and outlet 212 of the diverter valve 110 into the pipe 214. Thereafter, through the pipe 214, water flows into and through the enclosure 104, represented by arrows 207 and 211, respectively, and eventually flowing through the outlet port 114 and through the shower head 116. In operation in this configuration—the handle 112 in the Cold Position—water flowing from the shower head 116 has a low temperature T2, approximately the same temperature as water coming from the intake port 106 (i.e., "cold" water), which, as stated, is approximately the same temperature of shower water spray 117 when the handle 112 is in the Hot Position and the water within a full or substantially full reservoir 101 has not been sufficiently heated by the solar radiation 105.

Figure 4A:
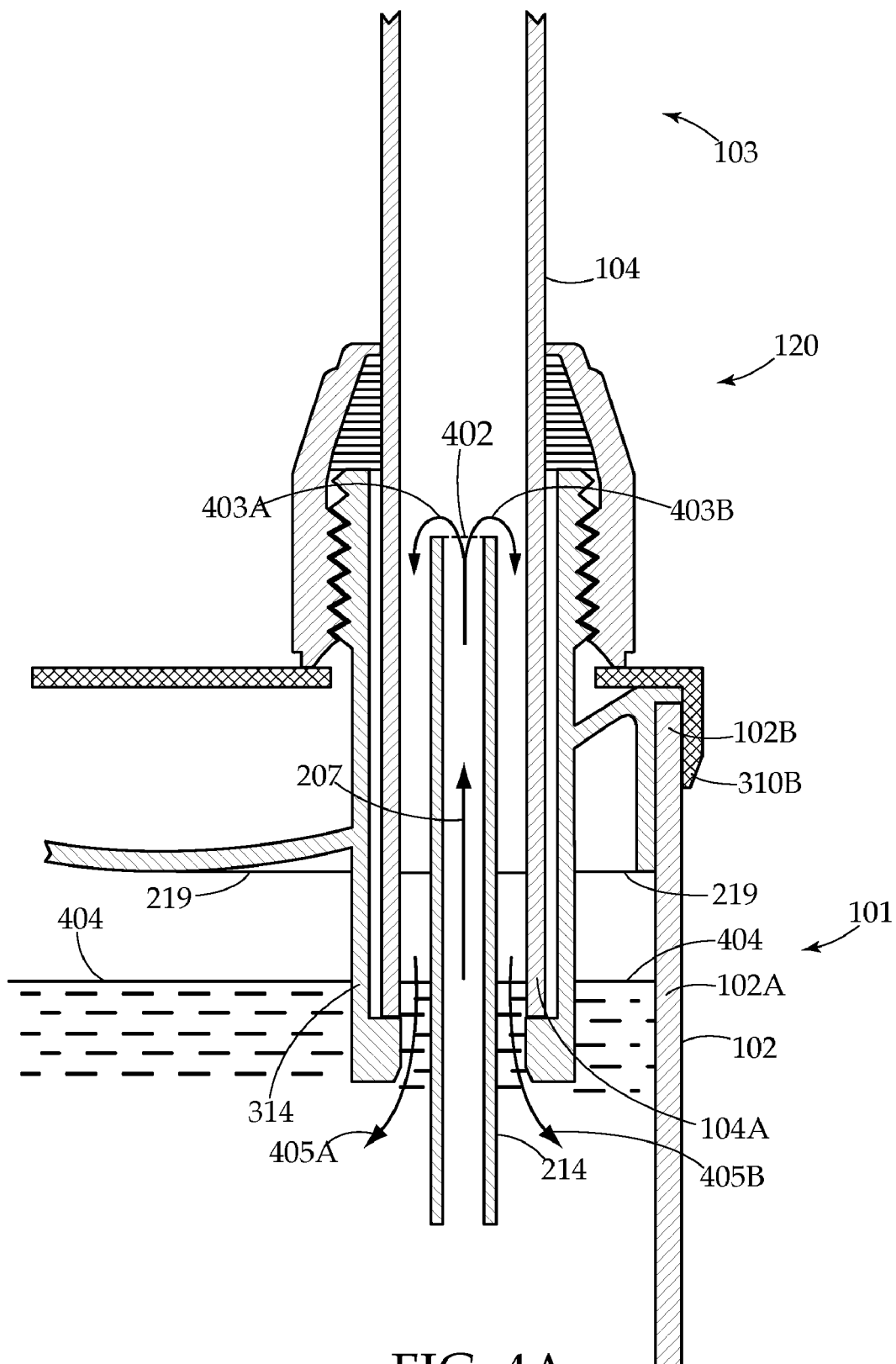
FIG. 4A is a schematic drawing illustrating a flow of water in the solar shower of FIG. 1 with the diverter valve in an extreme ("cold") position and a first water reservoir being at least partially empty.
Figure 4B:
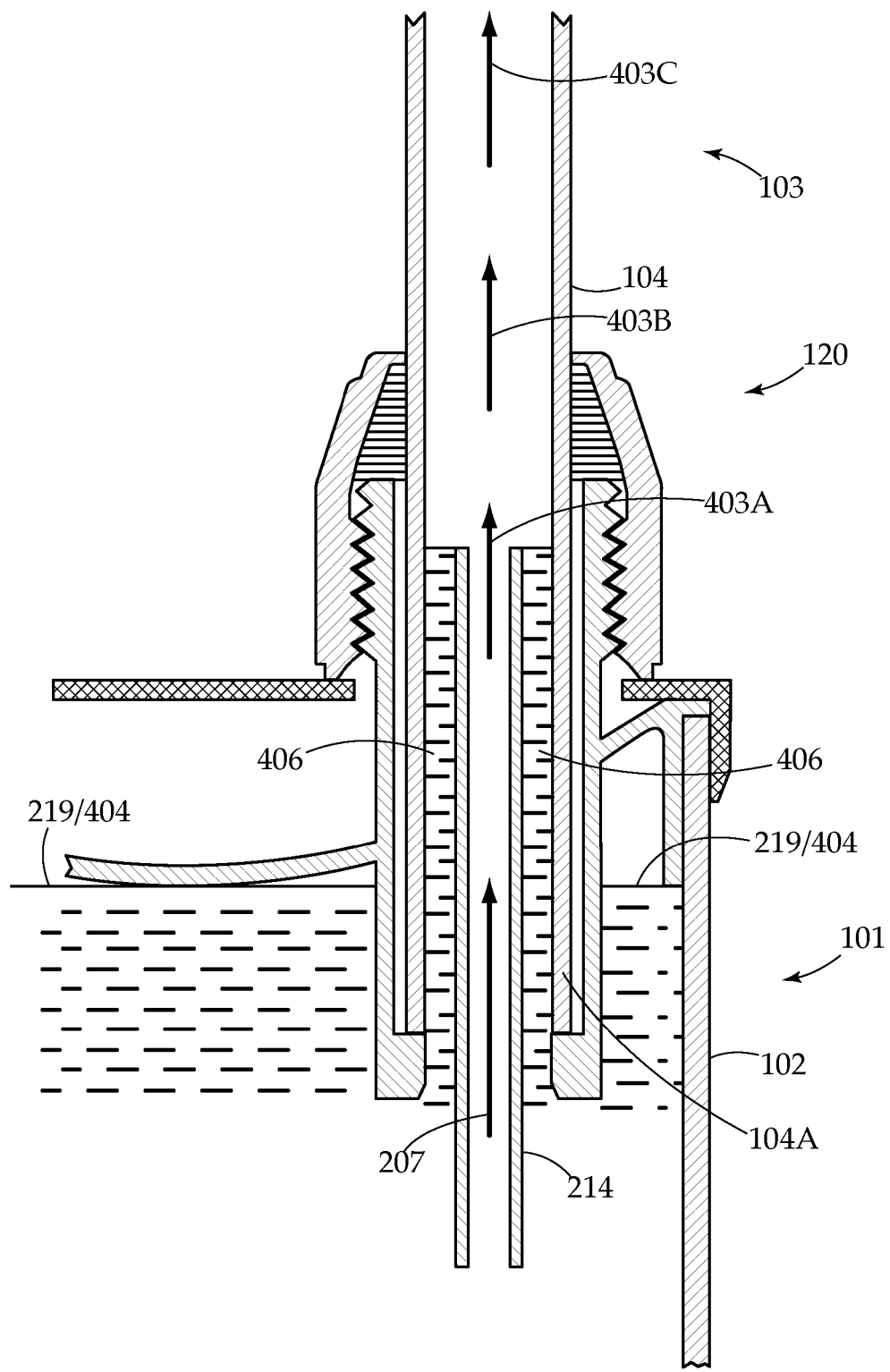
FIG. 4B is a schematic drawing illustrating a flow of water in the solar shower of FIG. 1 with the diverter valve in an extreme ("cold") position and a first water reservoir being full or substantially full of water.
Figure 4C:
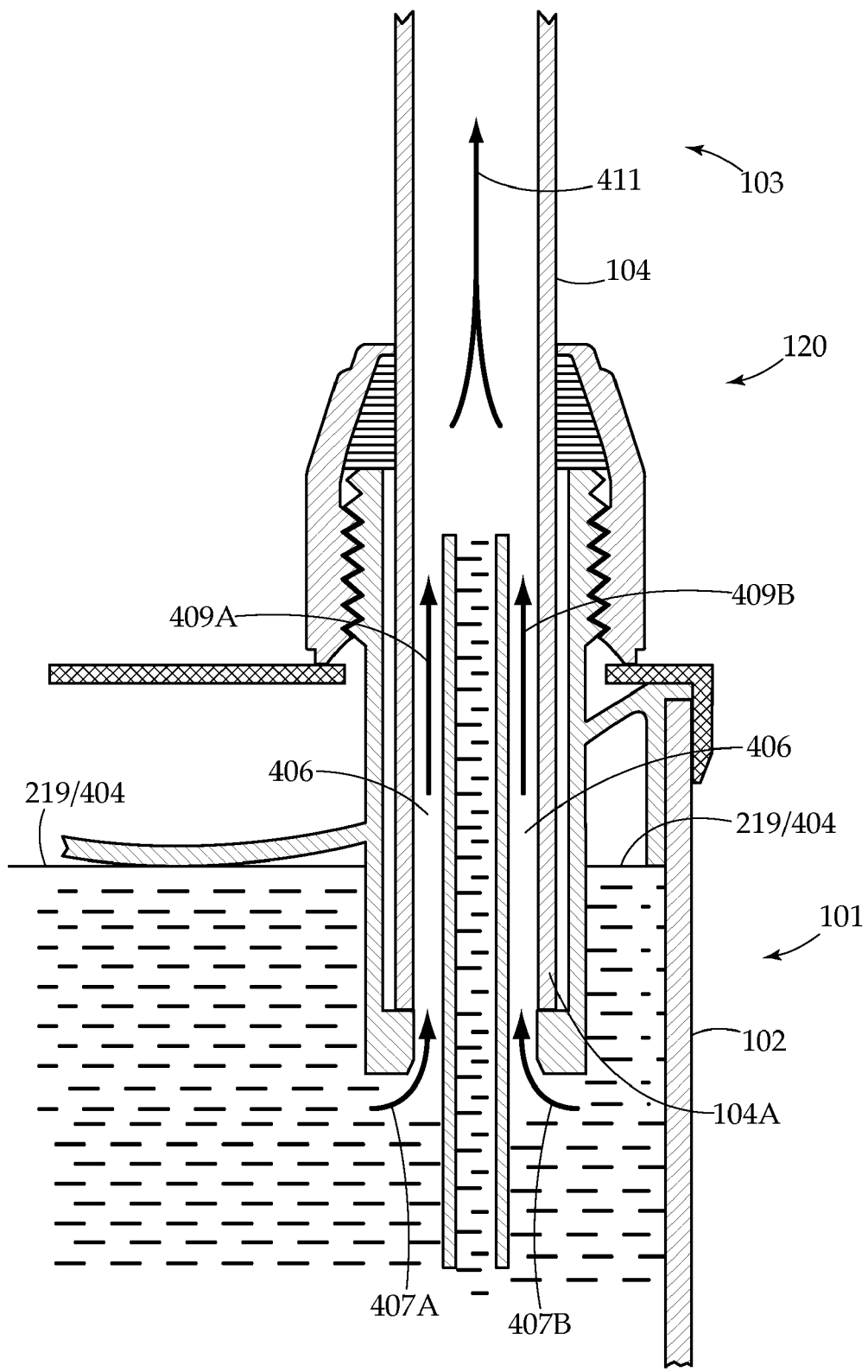
FIG. 4C is a schematic drawing illustrating a flow of water in the solar shower of FIG. 1 with the diverter valve in an extreme ("hot") position and a first water reservoir being full or substantially full of water.
Figure 4D:
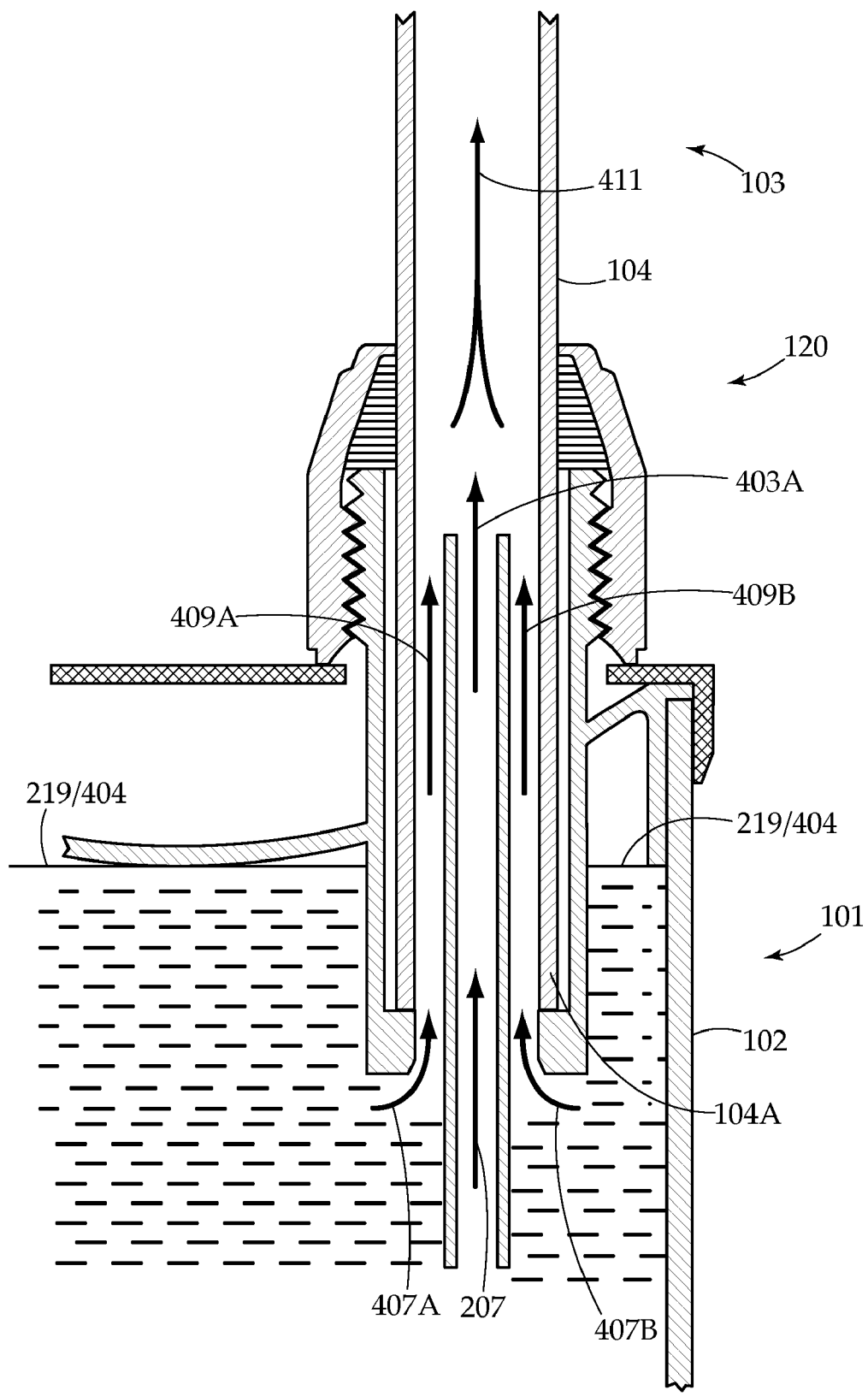
FIG. 4D is a schematic drawing illustrating a flow of water in the solar shower of FIG. 1 with the diverter valve at an intermediate (between "hot" and "cold") position and a first water reservoir being full or substantially full of water.

In operation, by selecting an infinite number of intermediate positions of the handle 112, temperature of water sprayed by the shower head 116 may be regulated in a range from T2 ("cold") to T1 ("hot"), depicted in detail in FIG. 4D.

It is understood that by application of basic plumbing principles, such as, for example, by changing placement of pipes 202 and 204 and/or by changing the configuration of the diverter valve 110, the "hot" and "cold" water positions of the handle 112 (i.e., the Hot Position and the Cold Position, respectively) may be reversed. For example, referring to FIG. 2, turning the handle 112 to the Hot Position will cause cold (instead of hot) water to flow to the shower head 116; conversely, turning the handle 112 to the Cold Position will cause hot (instead of cold) water to flow to the shower head 116.

In a preferred embodiment, when the reservoirs 101, 103 are at least partially empty, water fills both reservoirs prior to flowing into and from the shower head 116. For example, when the handle 112 is in the Hot Position (position 213), it has been previously disclosed how reservoir 101 is first filled with water entering into an interior thereof from the pipe 204, represented by arrow 203. As the level of water rises in reservoir 101 towards the top of enclosure 102, water only begins to flow into the first end 104A of the reservoir 103, when reservoir 101 is substantially full, represented by arrows 205A-B. After the reservoir 101 is completely filled, the fill line depicted by the line 219, water continues to flow into enclosure 104 of the reservoir 103, represented by arrows 205A-B. By first filling the first reservoir 101, water therein is given the opportunity to be warmed by solar radiation 105.

Similarly, with the handle 112 in the Cold Position (position 215), water coming from the intake port 106 flows through the pipe 202, inlet 206 and outlet 212 of the diverter valve 110 into the pipe 214. Thereafter, as long as reservoir 101 remains at least partially empty, water flows over the top end (brim) of pipe 214 (see arrow 207), and by application of gravitational forces, flows down into reservoir 101, until it is full (depicted in detail in FIG. 4A). As the level of water rises in reservoir 101 towards the top of enclosure 102, water begins to flow into the first end 104A of the reservoir 103, represented by arrows 205A-B, as that first end is firmly and securely seated in a substantially water tight joint within the coupler portion 306A of the ICCU 306 (see FIG. 3). After filling the reservoir 101 (the fill line depicted by line 219), water continues flowing from pipe 214 into first end 104A, thereby filling enclosure 104 of reservoir 103 (see partial fill line 220 of enclosure 104 in FIG. 2). Water continues to flow into and fill the elongated enclosure 104 of reservoir 103, represented by arrow 211, eventually flowing through the outlet port 114 and through the shower head 116. In this embodiment, by first filling the first reservoir 101, water therein is given the opportunity to be warmed by solar radiation 105.

FIG. 3 is a schematic drawing illustrating a connection between reservoirs 101 and 103 of the shower 100 of FIG. 1. Specifically, FIG. 3 shows an enlarged view of the portion A in FIG. 2 in an assembled state of the shower 100 (i.e., when the reservoirs 101 and 103 are attached to one another).

In the depicted embodiment, the reservoir 101 comprises an enclosure 102, further comprised of a sidewall 102A and a bottom (not shown), the ICCU 306 (i.e., inner cover/coupler unit 306) (depicted in FIG. 3 by reference numbers 306A, 306B, 306C and 306D) and a top cover 310. In an exemplary embodiment, the ICCU 306 is a single body piece comprised of: a coupler portion 306A; a concave shaped inner cover portion 306B; an outer edge 306C for sealing to enclosure sidewall 102A and the top cover 310; and an inner side wall 306D for sealing to the sidewall 102A.

Typically, the coupler portion 306A of the ICCU 306 has a form factor of a pipe-shaped elongated cylinder, that, in cross sections, is circular (or like shapes), and is open on both ends, thereby allowing for: the receipt and attachment of first end 104A of enclosure 104; the receipt of the pipe 214 from reservoir 101 for fluidly connecting to an interior of enclosure 104 when reservoirs 101 and 103 are attached;, and the flow of water between reservoirs 101 and 103. The coupler portion 306A is further comprised of a threaded portion 308 (for receiving the threaded lock nut 302), a sleeve portion 314 and an inner seat 312 (for securely seating the first end 104A of enclosure 104 of reservoir 103). In connecting reservoirs 101 and 103, the coupler portion 306A receives the first end 104A of the enclosure 104 of reservoir 103, and, in operation with the rubber seal 304 and the lock nut 302, comprises the connector portion 120 of the shower 100, thereby providing a rigid and water-tight coupling between reservoirs 101 and 103.

Although in an exemplary embodiment the ICCU 306 is a single body unit, alternatively, the ICCU 306 may be fabricated by joining together a separate coupler unit 306A and a separate inner cover unit 306B (with an outer edge 306C and an inner side wall 306D), which may be joined together as a water tight joint using water tight adhesives and the like to form the ICCU 306.

Typically, the ICCU 306 may be fabricated from polymers, plastics, composites, metals, alloys, or a combination thereof. In one exemplary embodiment, these components of the shower 100 are fabricated from PVC, PE, PP, ABS or ASA using, for example, injection-molding or extrusion techniques to form a single body unit.

Generally, the ICCU 306 has a circular, concave form factor. In the depicted embodiments, the inner cover portion 306B of the ICCU 306 is concave in shape, as this configuration provides added strength and support to the coupler portion 306A. In addition, the concave feature adds resistance strength to withstand the water pressures that build within reservoir 101, particularly when enclosure 102 is filled with water and especially when both reservoirs 101, 103 are filled with water and the shower 100 is in operation. The ICCU 306 further comprises an outer edge 306C and an inner side wall 306D for attachment to the open top end of enclosure 102, thereby forming an inner top seal to reservoir 101. The ICCU 306 has a circular form factor of a sufficient diameter so as to firmly attach to the diametric top edge 102B of the enclosure 102, with inner side wall 306D firmly flush with the top interior surface of side wall 102A of enclosure 104 and outer edge 306C firmly flush with the top edge 102B of the enclosure 102. Water-tight joints are fabricated within the paths between adjacent surfaces of outer edge 306C and top edge 102B and between the outer surface of the inner side wall 306D and the inner surface of the side wall 102A by using water tight sealants and/or adhesives and the like.

With the ICCU 306 properly affixed and water-tight to the top of enclosure 102, the coupler portion 306A extends in an operational position, i.e., substantially vertical, for receipt and secure attachment of the first end 104A of reservoir 103. In said operational position, the coupler portion 306A further allows entry and receipt of the open end of the pipe 214, which, when reservoirs 101 and 103 are attached, is fluidly connected to an interior of enclosure 104, represented by arrow 207 in FIG. 3.

The top cover 310 provides the outer top surface cover to reservoir 101. Typically, the form factor of the top cover 310 is circular and of sufficient diameter to firmly affix to the top of enclosure 102. Generally, the top cover 310 may be fabricated from polymers, plastics, composites, metals, alloys, or a combination thereof. In one exemplary embodiment, the top cover 310 is fabricated from PVC, PE, PP, ABS or ASA using, for example, injection-molding or extrusion techniques.

The top cover 310 is further comprised of an aperture 310A—to allow passage of the substantially vertically extended coupler portion 306A—and a side edge 310B for enclosing around the outer top diametric surface of the side wall 102A. The top cover 310 is affixed to reservoir 101 by way of a water-tight joint between the interior surfaces of side edge 310B (including adjacent portions thereto of top cover 310) and the joint created by the outer edge 306C and top cover 102B using water tight sealants, adhesives, and the like. Water-tight joints are fabricated within the paths between adjacent surfaces of (i) inner side edge 310B and (ii) the outer, exterior surface of side wall 102A, the outer exterior edge surface of outer edge 306C, and the adjacent top exterior surface of outer edge 306C by using water tight sealants and/or adhesives and the like.

Alternatively, in addition to water-tight adhesives, sealants and the like, as described herein, other means may be used to create water-tight joints between various elements of the shower 100. Such other water-tight means include, for example, chemical or heat melding or fusion, mechanical couplers, such as rivets, and other means generally known for creating water-tight joints.

The coupler portion 306A of the ICCU 306, particularly, the threaded portion 308, extends substantially vertical through the aperture 310A of the top cover 310, the open end of which (shown in phantom 320) receives the first end 104A of enclosure 104 when attaching reservoirs 101 and 103.

To attach the reservoir 101 to the reservoir 103, the first end 104A of enclosure 104 of reservoir 103 and the threaded coupler 308 are advanced towards one another and enclosure 104 is inserted into open end 320 of the coupler 308 and advanced therein until it is firmly seated against seat 312. The rubber seal 304 and the lock nut 302, having been previously inserted onto the first end 104A of enclosure 104 and slid slightly upward in the direction of second end 104B, are advanced over enclosure 104 towards threaded coupler 308. The rubber seal 304 is first firmly seated against the top open end of the coupler 308 (all the while keeping the first end 104A of the enclosure firmly held against the seat 312). While maintaining said position, the lock nut 302 is advanced towards the threaded coupler 308, until the threaded portions of the lock nut 302 and the coupler 308 engage. The lock nut 302 is then firmly tightened to the coupler 308, by, for example, turning the engaged lock nut 302 in a clockwise rotation, thereby screwing it onto threaded coupler 308 until hand tight, thereby forming joint portion 120 and providing a rigid and water-tight coupling between the reservoirs 101 and 103.

When reservoirs 101 and 103 are firmly attached for operation, pipe 214 from reservoir 101 extends into the first end 104A of enclosure 104 of reservoir 103, thereby being fluidly connected to an interior of reservoir 103, represented by arrow 207 in FIG. 3. The shower 100 is now operational as described in the preceding paragraphs.

Correspondingly, to detach the reservoirs 101 and 103, the lock nut 302 is disengaged from the threaded coupler 308 of the coupler portion 306A of the ICCU 306, and enclosures 102 and 104 are pulled apart, thereby separating the reservoirs 101 and 103.

Typically, the lock nut 302 may be fabricated from polymers, plastics, composites, metals, alloys, or a combination thereof. In one exemplary embodiment, these components of the shower 100 are fabricated from PVC, PE, PP, ABS or ASA using, for example, injection-molding or extrusion techniques. Generally, the lock nut 302 has a threaded inner portion of a circular cross section form factor for engaging with and securing to the threaded coupler portion 308, and an exterior shape that be a circular cross section form factor, or hexagonal, octagonal or other nut-shaped form factor for ease of tightening and loosening.

Typically the rubber seal 304 may be fabricated from rubber, synthetic rubber, polyisoprene, polybutadiene, butyl rubber or any number of elastic polymers or like substances used to create water tight seals and washers. Generally, the rubber seal 304 has an inner circular opening for passage of the first end 104A of the enclosure 104. When properly engaged, as described above, pressure applied when the lock nut 302 is tightened compresses the rubber seal 304, thereby creating a secure, water-tight detachable joint 120.

FIGS. 4A-4D are schematic drawings illustrating the flow of water in the solar shower 100 with the diverter valve 110 (not shown) and handle 112 (not shown) in various positions and with the reservoir 101 being full and/or at least partially empty. Water flow when the handle 112 is in the Hot Position and with reservoir 101 being at least partially empty has been previously explained with respect to FIG. 3, including the process of heating the water in reservoir 101 by solar radiation.

FIG. 4A is a schematic drawing illustrating a flow of water between reservoirs 101 and 103 of the shower 100 of FIG. 1 with the handle 112 in the Cold Position and with reservoir 101 being at least partially empty. Water flows from outlet port 212 of the diverter valve 110 (not shown) into pipe 214, represented by arrow 207. Upon reaching the upper end or brim of pipe 214 (shown in phantom 402), and by application of gravitational forces, flows down through the first end 104A of enclosure 104 of reservoir 103, represented by arrows 403A and 403B, and into enclosure 102 of reservoir 101, represented by arrows 405A and 405B. As long as reservoir 101 remains at least partially empty, for example, shown in FIG. 4A by water line 404, water will continue to flow in this manner until enclosure 102 of reservoir 101 is filled, shown in FIG. 4A by fill line 219.

FIG. 4B is a schematic drawing illustrating a flow of water between reservoirs 101 and 103 of the shower 100 of FIG. 1 with the handle 112 in the Cold Position and with reservoir 101 filled or substantially filled with water. The water line 404 is equal or approximately equal to the fill line 219, represented by a line 219/404. Once reservoir 101 is filled with water, water flowing from pipe 214, represented by arrow 403A, quickly fills an interior 406 of enclosure 104, i.e., the interior of the space between the outer surface of pipe 214 and the inner surface of first end 104A of enclosure 104. Thereafter, water continues flowing through enclosure 104, represented by arrows 403B and 403C. Water 117 flowing from the shower 100 of FIG. 4B has a temperature T approximate to that as the water source 201, in this instance, T2 (cold).

FIG. 4C is a schematic drawing illustrating a flow of water between reservoirs 101 and 103 of the shower 100 of FIG. 1 with the handle 112 in the Hot Position and with reservoir 101 filled or substantially filled with water. The water line 404 is equal or approximately equal to the fill line 219, represented by the line 219/404.

In the shower 100 of FIG. 4C, water flows from the open end of pipe 204, which is fluidly connected to an interior of reservoir 101, represented by arrow 203 in FIG. 2. Because reservoir 101 is filled, water enters reservoir 103 by entering through the open end of the first end 104A of the enclosure 104, represented by arrows 407A-B. Water continues flowing into enclosure 104 through the space 406, said water represented in FIG. 4C by arrows 409A-B. Thereafter, the water flows to the shower head 116 via enclosure 104 of reservoir 103, represented by arrow 411.

The shower water spray 117 of the shower 100 of FIG. 4C will have a temperature T depending on the extent to which the water in filled reservoir 101 has been heated by solar radiation 105, described previously herein.

FIG. 4D is a schematic drawing illustrating a flow of water between reservoirs 101 and 103 of the shower 100 of FIG. 1 with the handle 112 in any of the infinite positions between the Hot and Cold Positions, wherein both "hot" and "cold" water mix and flow to the shower head 116, thereby achieving an intermediate temperature as defined by a user of the shower 100 by adjusting the handle 112 to achieve the desired temperature. The shower 100 of FIG. 4D is filled or substantially filled with water; as such, water line 404 is equal or approximately equal to the fill line 219, represented by the line 219/404.

Assuming that the water of reservoir 101 of the shower 100 of FIG. 4D has been sufficiently warmed, hot water flows from reservoir 101, represented by arrows 407A-B and arrows 409A-B, cold water flows through and from the pipe 214, represented by arrows 207 and 403A, respectively, and thereafter a hot and cold water mix flows through enclosure 104, represented by an arrow 411.

The shower water spray 117 of the shower 100 of FIG. 4D will have a temperature T depending on the extent to which the water in filled reservoir 101 has been heated by solar radiation 105, described previously herein, and as determined by the user of the shower 100 by adjusting the handle 112 of the diverter valve 110 between the Hot and Cold Positions.

Although the invention herein has been described with reference to particular illustrative embodiments thereof, it is to be understood that these embodiments are merely illustrative of the principles and applications of the present invention. Therefore numerous modifications may be made to the illustrative embodiments and other arrangements may be devised without departing from the spirit and scope of the present invention, which is defined by the appended claims.

What is claimed is:

1. A solar shower, comprising:
 a first water reservoir having a first port for coupling to a water source, and a diverter valve for regulating temperature of water flowing into a shower head; and
 a second water reservoir having a second port for coupling to the shower head, said second reservoir detachably connected to the first reservoir;
 wherein the first water reservoir comprises:
 a first enclosure;
 the diverter valve having a first inlet, a first outlet, and a second outlet;
 an inner cover having a coupler, said coupler attached through the inner cover and having a first end and a second end;
 an outer top cover;
 a first pipe having a first end connected to first inlet and a second end connected to the first port;
 a second pipe having a third end connected to the first outlet and a fourth end fluidly connected to an interior of the first enclosure; and
 a third pipe having a fifth end connected to the second outlet and a sixth end fluidly connected to an interior of the coupler through the first end of the coupler.

2. The solar shower of claim 1, wherein:
 the inner cover and the coupler are fabricated as a single unit.

3. The solar shower of claim 1, wherein:
 the coupler is attached through the inner cover with a fixed water-tight joint.

4. The solar shower of claim 1, wherein:
 the inner cover is concave.

5. The solar shower of claim 1, wherein the second water reservoir comprises:
 a second enclosure having a first end and a second end;
 wherein the second end of the coupler of the first reservoir receives for detachable attachment the first end of the second enclosure; and
 the second end of the second enclosure is attached to the second port.

6. The solar shower of claim 1, wherein the sixth end of the third pipe of the first water reservoir is fluidly connected to an interior of the first end of the second enclosure of the second water reservoir, all within the coupler.

7. The solar shower of claim 1, wherein the second end of the coupler is threaded for receiving a rubber seal and a threaded lock nut to form a detachable joint between the first reservoir and the second reservoir.

8. The solar shower of claim 7, wherein the detachable joint is a substantially water-tight joint.

9. The solar shower of claim 7, wherein at least one of (i) the first enclosure and the second enclosure, (ii) the first through third pipes, (iii) the inner cover and the coupler, (iv) the outer top cover, and (v) the threaded lock nut is fabricated from a polymer, a plastic, a composite, a metal, an alloy, or a combination thereof.

10. The solar shower of claim 7, wherein at least one of (i) the first enclosure and the second enclosure, (ii) the first through third pipes, (iii) the inner cover and the coupler, (iv) the outer top cover, and (v) the threaded lock nut is fabricated from polyvinyl chloride (PVC), polyethylene (PE), polypropylene (PP), acrylonitrile butadiene styrene (ABS) or acrylonitrile styrene acrylate (ASA).

11. The solar shower of claim 7, wherein the rubber seal is fabricated from one or more elastic polymers.

12. The solar shower of claim 7, wherein the rubber seal is fabricated from rubber, synthetic rubber, polyisoprene, polybutadiene or butyl rubber.

* * * * *